United States Patent
Wu

[11] Patent Number: 6,059,377
[45] Date of Patent: May 9, 2000

[54] WHEEL RIM FRAME OF BICYCLE

[76] Inventor: Chun-Yi Wu, No. 13, Hsin-Hsin Rd., Tainan City, Taiwan

[21] Appl. No.: 09/167,718

[22] Filed: Oct. 7, 1998

[51] Int. Cl.[7] .................................................. B60B 21/00
[52] U.S. Cl. ........................ 301/95; 301/37.24; 362/473
[58] Field of Search .................... 301/37.22, 95, 301/37.1, 37.24; 362/473, 500; 428/343, 344, 354

[56] References Cited

U.S. PATENT DOCUMENTS

| | | | |
|---|---|---|---|
| 3,083,060 | 3/1963 | Mulhern | 301/37.24 |
| 3,951,517 | 4/1976 | Levy et al. | 350/99 |
| 4,017,151 | 4/1977 | Kagayama | 350/99 |
| 4,575,789 | 3/1986 | Tsuyama | 362/346 |
| 4,943,139 | 7/1990 | Bacon, Jr. et al. | 301/37.1 |
| 5,105,308 | 4/1992 | Holley et al. | 301/111 |
| 5,353,153 | 10/1994 | Craaig | 359/523 |
| 5,823,653 | 10/1998 | Elam, Jr. et al. | 362/72 |
| 5,876,108 | 3/1999 | Chien | 362/464 |

*Primary Examiner*—S. Joseph Morano
*Assistant Examiner*—Long Bao Nguyen
*Attorney, Agent, or Firm*—Dougherty & Troxell

[57] ABSTRACT

This invention is intended to provide an improved structure of wheel rim frame of bicycle, wherein a stripe sticker printed with fluorescent patterns is attached onto a bottom portion of the wheel rim frame, and a protective membrane is further attached onto the sticker, so that, by favor of the printed patterns and the protective membrane, a diversified wonderful feeling is offered by the wheel rim frame to meanwhile remind people of being alert and to protect the improved structure from being scraped to prolong usable life; and besides, this invention can be employed to cooperate with wheel rim frame of various shapes or efficacies, and owing to simplified process, a lower manufacturing cost is achievable.

4 Claims, 6 Drawing Sheets

WHEEL RIM FRAME OF BICYCLE

BACKGROUND OF THE INVENTION

Inasmuch as the lack of variety, the monotonous prior wheel rim frame of bicycle has failed to exhibit personal characteristics to attract prospective consumers, hence, some kinds of sticker designed with various stripes or warning patterns have been proposed showing its specialties or security purposes. However, owing to the poor weather durability, the stickers are liable to be disintegrated or detached after some period of weather inclemency. Subsequently, spray painting follows the sticker to be another option with inherent imperfections, such as only simple pattern available, longer working time required, higher cost spent, or being scraped easily, and in the long run, the sticker becomes unrecognizable. The lately developed wheel rim protective envelope in the same shape with the wheel rim frame and being printed with stripes is mounted on the wheel rim frame and rolled together to form a circle and finally a wheel rim. In this case, due to many a lot of wheel rim frame of various cross sections in the market, it seems rather thorny for producing different type protective envelopes to match all kinds of wheel rim frame with high manufacturing cost and procession difficulties. Moreover, a protective envelope shall inevitably increase the weight of a wheel rim frame, and it may consequently affect operation of a bicycle in case of imbalance. In view of the above-described defects, the inventor is to propose an improved structure concerning the subject article for another choice.

SUMMARY OF THE INVENTION

This invention is an improved structure relating to the wheel rim frame of bicycle by gluing a strip sticker printed with fluorescent patterns and a protective membrane in sequence onto the bottom portion of a wheel rim frame showing a good appearance and providing a function of security concurrently, and besides, the improved structure can be made easily at a relatively lower cost to fit various shapes or functions of the wheel rim frame

DETAILED DESCRIPTION OF THE PREFFRRED EMBODIMENT

This invention is proposed mainly to provide an easy-made and diversified wheel rim frame of bicycle, which is good in looking and is applicable to various requirements.

As to exemplify the above-mentioned effects of this invention, description to a preferred embodiment will be made with reference to the related drawings annexed.

Figure 1:
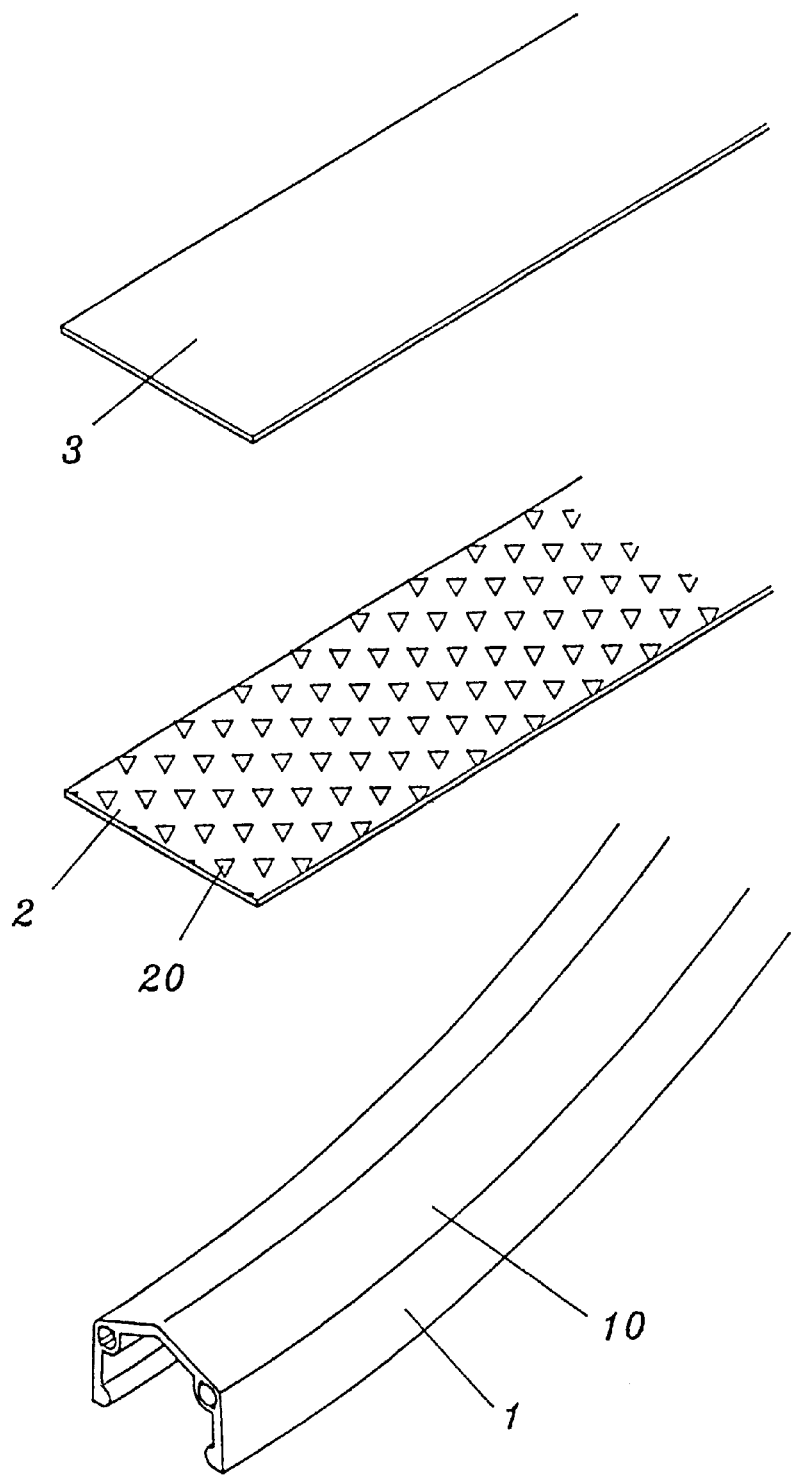
FIG. 1 is an elevation and exploded view of this invention.

First of all, as shown in FIG. 1, this invention mainly comprises a wheel rim frame 1, wherein a bottom portion 10 is provided. A sticker 2 printed with fluorescent patterns 20 is attached to the bottom 10 of the wheel rim frame 1, and a transparent membrane 3 is employed to overlay and protect the sticker 2 against scrapping or damaging.

Figure 2:
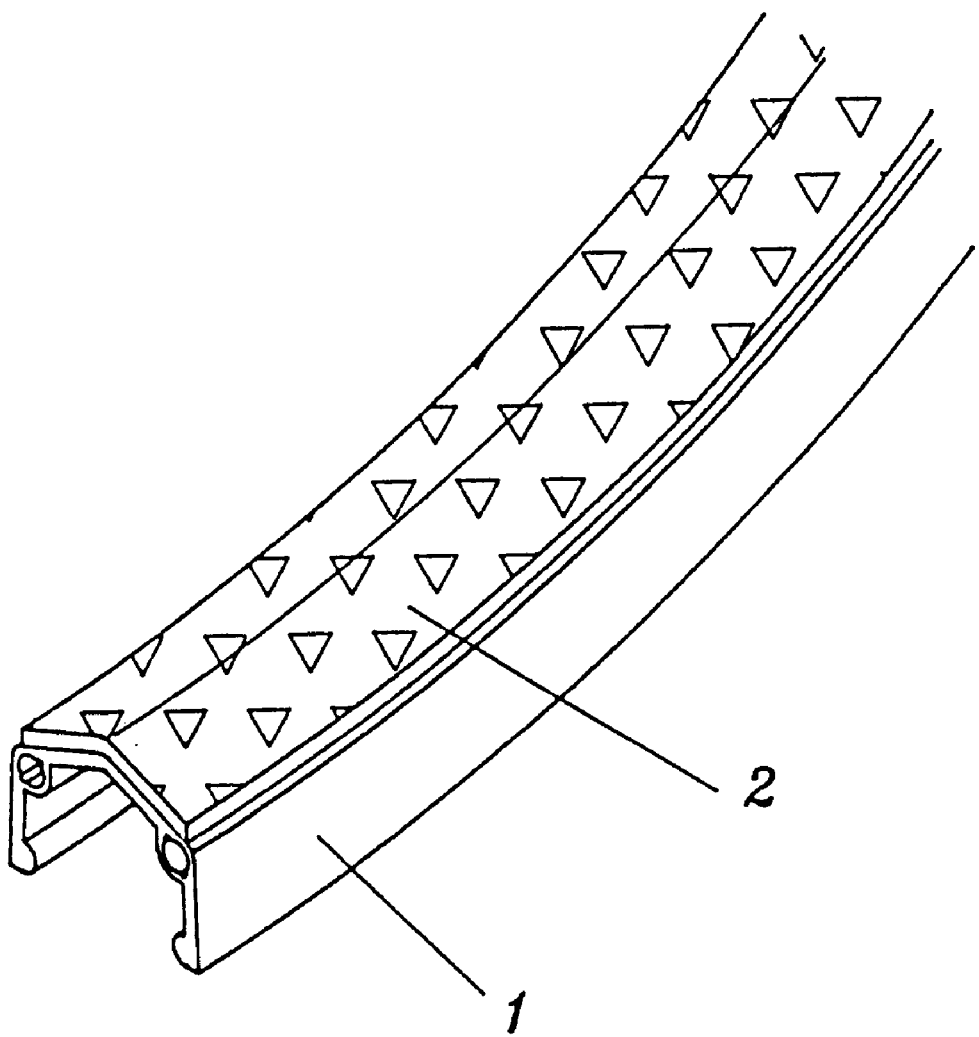
FIG. 2 is an elevation and assembled view of this invention.

When assembling, as shown in FIG. 2, the first step is to coat a layer of glue on the bottom portion 10 of the wheel rim frame 1. The next is to attach the sticker 2 plainly to the bottom portion 10 of the wheel rim frame 1, then stick the transparent membrane 3 on the sticker 2 to finish the simple job. Thus, when the wheel rim frame 1 is on its way to operate, the fluorescent patterns on the sticker 2 will provide a unique wonderful feeling and remind people of being alert, and meanwhile show off a special personality. It is the protection function of the transparent membrane 3 that ensures the sticker 2 not to be scrapped for prolonging the usable life.

Figure 3:
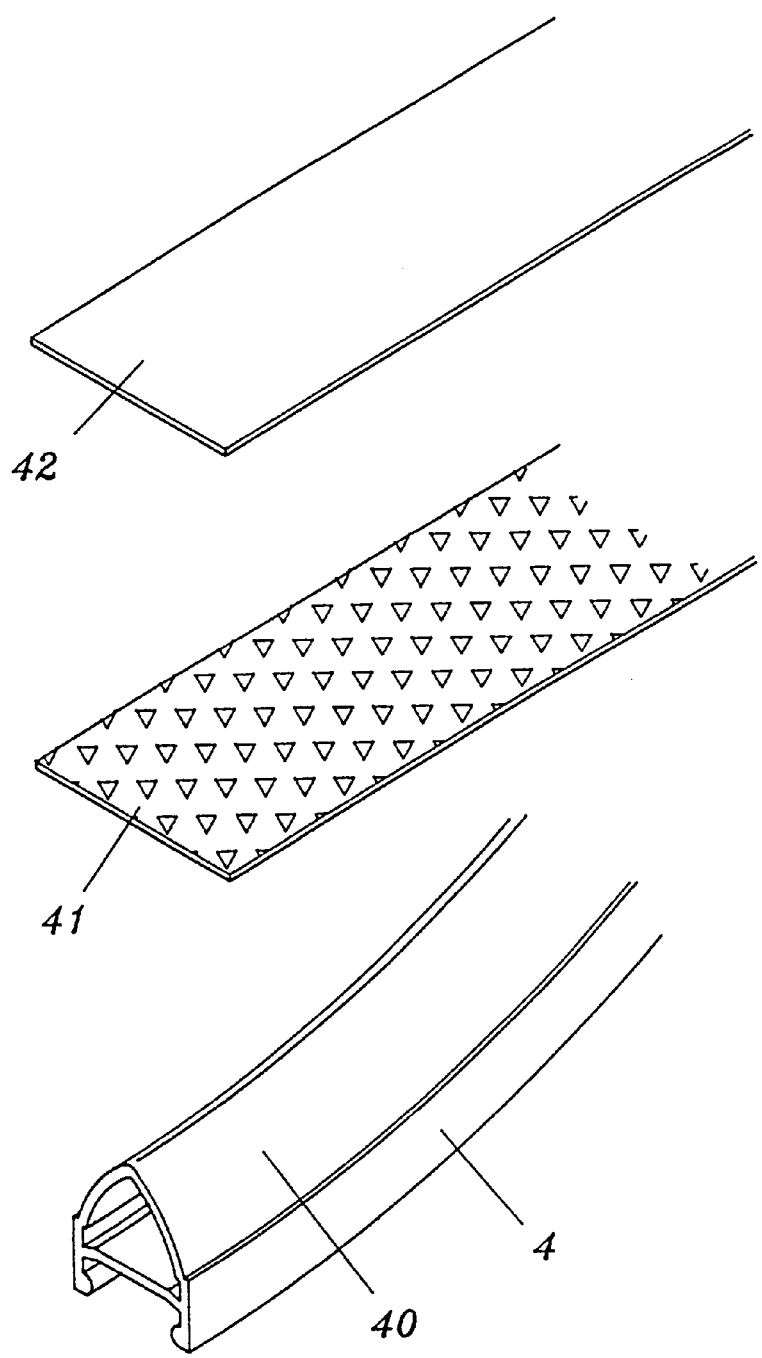
FIG. 3 is an elevation and exploded view of another embodiment of this invention.
Figure 4:
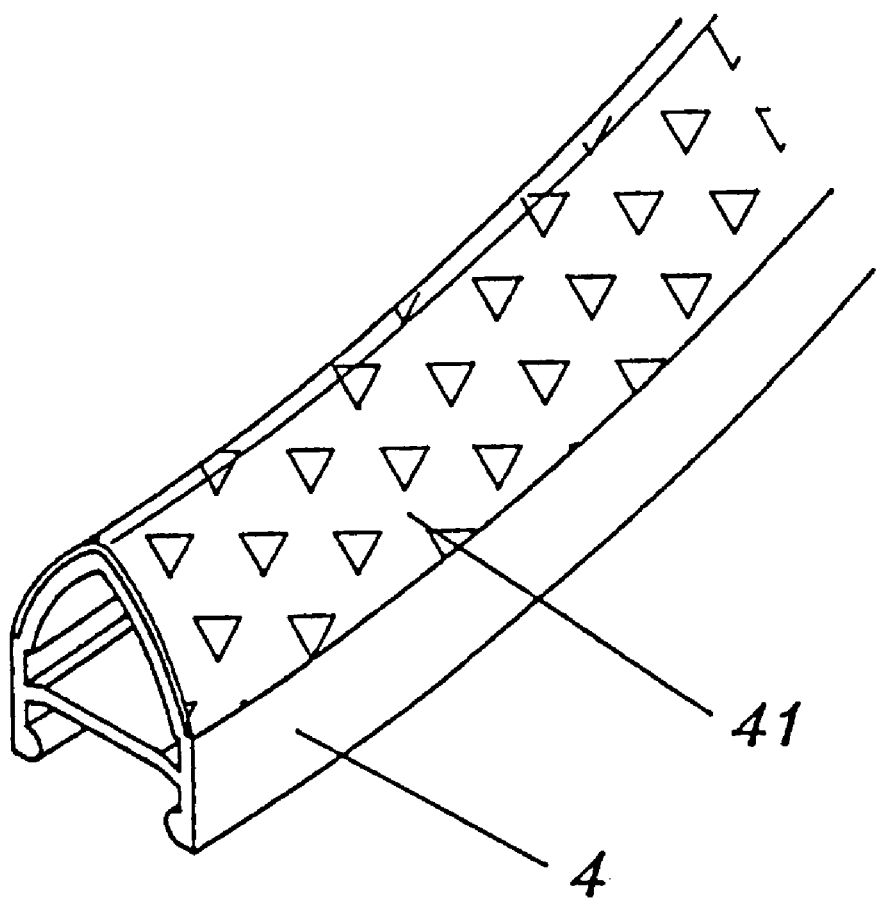
FIG. 4 is an elevation and assembled view of another embodiment of this invention.

Another embodiment of this invention is shown in FIG. 3. There a connection portion 40 is provided to a concave circumference rim in its bottom portion of the wheel rim frame 4. Then, the connection portion 40 is coated with a layer of glue, and thereafter, a sticker 41 is attached plainly on the connection portion 40, and in turn for a membrane 42 on the sticker 41 (as shown in FIG. 4), so that the bottom portion of the wheel rim frame 4 becomes more tidy and beautiful and having the same efficacy attained.

Figure 5:
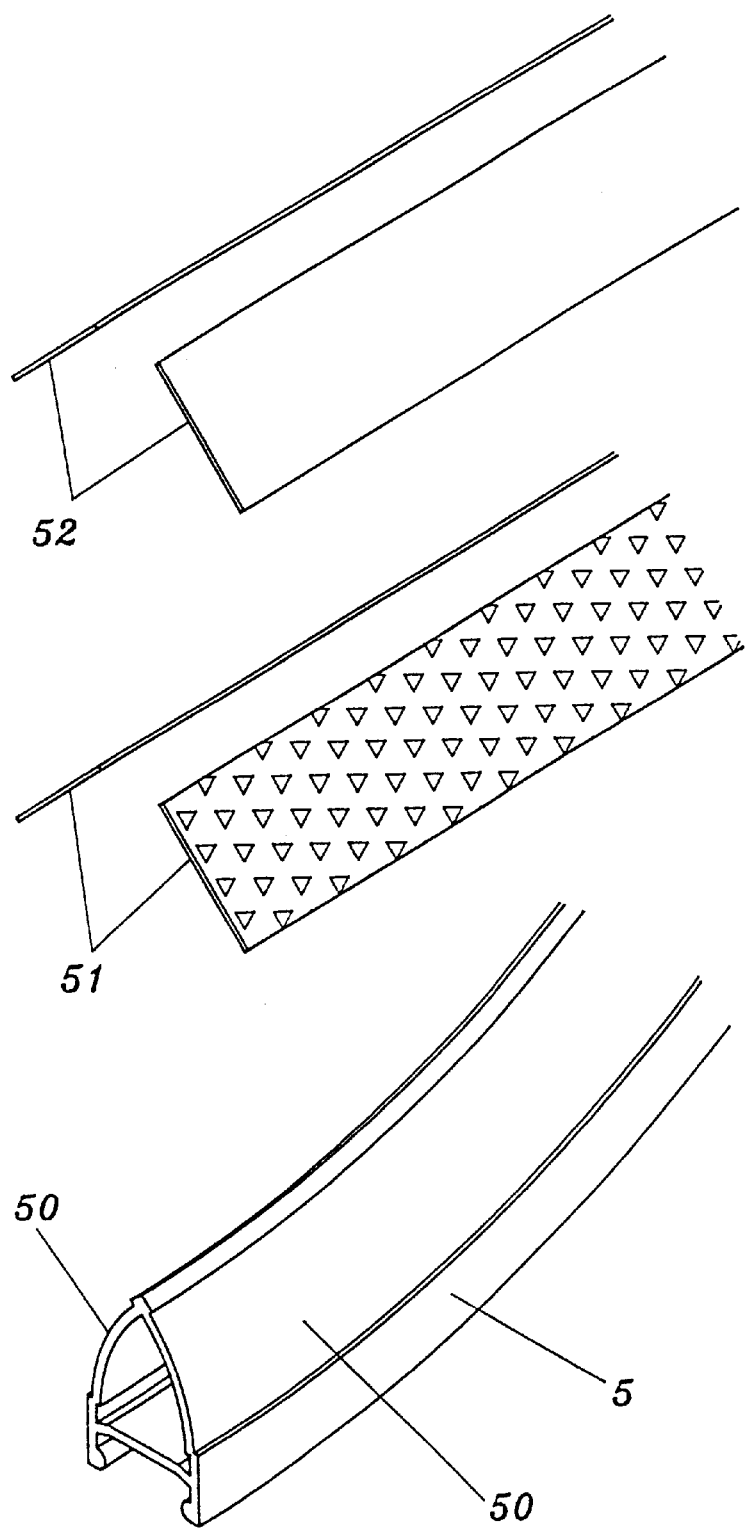
FIG. 5 is an elevation and exploded view showing this invention applied to a mountaineering wheel rim frame.
Figure 6:
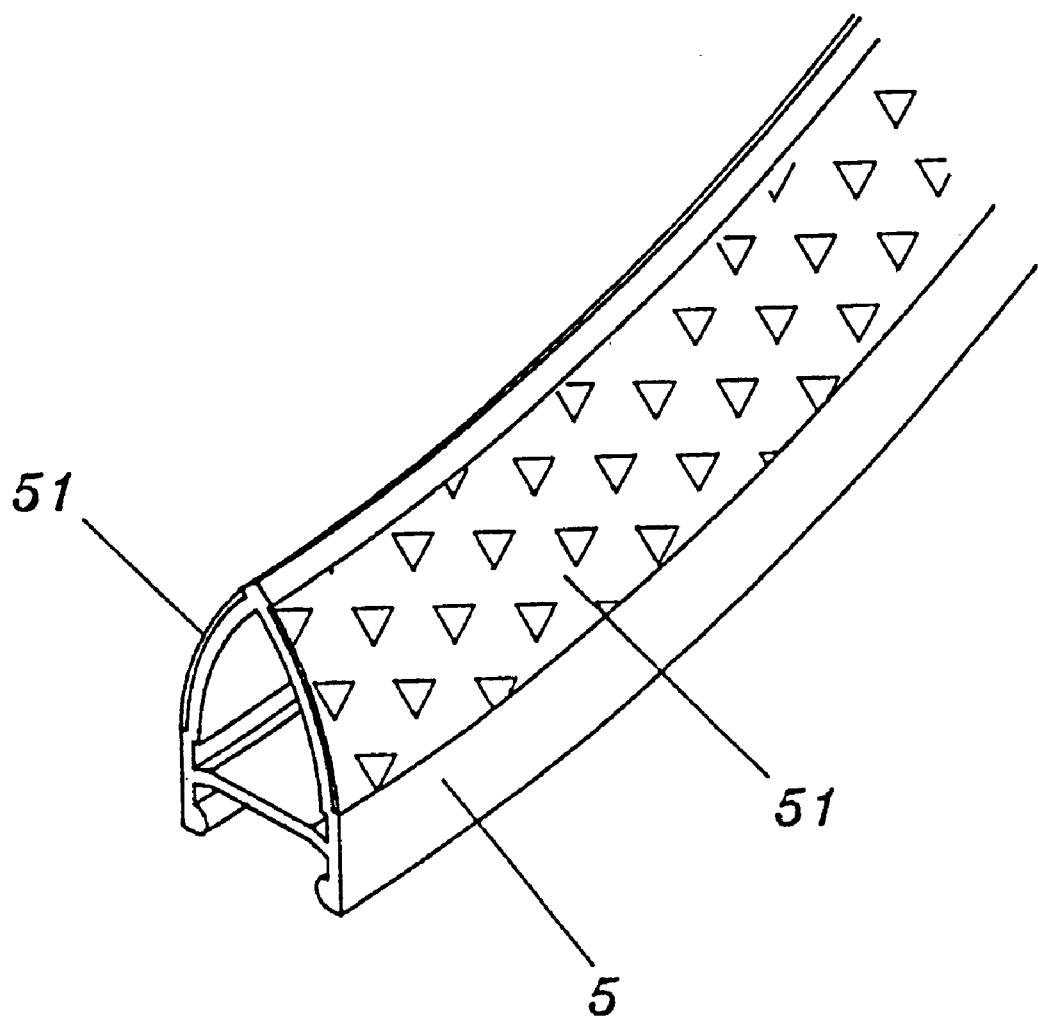
FIG. 6 is an elevation and assembled view showing this invention applied to a mountaineering wheel rim frame.

A further embodiment of this invention is shown in FIG. 5. When this invention is applied to a wheel rim frame 5 of a mountaineering bicycle, its conical bottom portion of the wheel rim frame 5 is divided into two faces, wherein a connection portion 50 is disposed on each face. Two stickers 51 are attached plainly onto each connection portion 50 respectively, then, a transparent membrane 52 onto each sticker 51 subsequently (as shown in FIG. 6), and thereby the wheel rim frame 5 looks more tidy and beautiful and having the same efficacy attained.

From the above described, it is understood that this invention is essentially advantageous in:

1. Easy-made and low manufacturing cost.
2. Applicable to a wheel rim frame of various shapes and efficacies.
3. The fluorescent patterns on a sticker offering diversified wonderful feeling in vision and a function of warning for security purpose.

To the best of our knowledge, the present invention is feasible and practical to achieve the expected efficacy, and so far, we haven't found any disclosed article built with the same structure or mechanism in patent communiqués or in markets. At least one preferred embodiment of the present invention has been described as above in connection with the annexed drawings, and it should be realized that the structural changes or other examples might be made or given without departing from either the spirit or scope of the present invention.

What is claimed is:

1. An improved structure of a wheel frame of a bicycle comprising:

a wheel rim frame including a bottom portion,:

a sticker printed with various patterns attached to said bottom portion; and, a protective membrane attached to overlay said sticker for prolonging the usable life of said sticker.

2. The improved structure of a wheel rim frame of a bicycle according to claim 1, which includes a connection portion forming a concave bottom circumference of said wheel rim frame, a sticker and a protective membrane attached in sequence to said bottom portion of said wheel rim frame.

3. The improved structure of a wheel rim frame of a bicycle according to claim 1, which includes a conical bottom circumference having two lateral sides and two connection portions constructed and arranged each at one side of said wheel rim frame, a said sticker and a said protective membrane attached one after the other to each of said connection portions.

4. The improved structure of a wheel rim frame of a bicycle according to claim 1 wherein the patterns printed on said sticker are in fluorescent color.

\* \* \* \* \*